United States Patent
Filho et al.

(10) Patent No.: US 12,292,863 B2
(45) Date of Patent: May 6, 2025

(54) METADATA-BASED GENERIC PARSING

(71) Applicant: SAP SE, Walldorf (DE)

(72) Inventors: Roberto Usberti Filho, Ladenburg (DE); Nishant Gopinath, Wayne, PA (US); Vladimir Wasiutinski, Dresden (DE)

(73) Assignee: SAP SE, Walldorf (DE)

( * ) Notice: Subject to any disclaimer, the term of this patent is extended or adjusted under 35 U.S.C. 154(b) by 261 days.

(21) Appl. No.: 17/574,430

(22) Filed: Jan. 12, 2022

(65) Prior Publication Data

US 2023/0222104 A1 Jul. 13, 2023

(51) Int. Cl.
*G06F 16/21* (2019.01)
*G06F 16/28* (2019.01)

(52) U.S. Cl.
CPC .......... *G06F 16/212* (2019.01); *G06F 16/288* (2019.01)

(58) Field of Classification Search
CPC .............................. G06F 16/212; G06F 16/288
See application file for complete search history.

(56) References Cited

U.S. PATENT DOCUMENTS

| | | | | |
|---|---|---|---|---|
| 6,523,172 B1 * | 2/2003 | Martinez-Guerra | .... | G06F 8/427 704/9 |
| 8,874,621 B1 * | 10/2014 | Goodwin | .............. | G06F 16/289 707/756 |
| 9,830,319 B1 * | 11/2017 | Tortosa | ................... | G06F 16/86 |
| 11,663,189 B1 * | 5/2023 | Nauduri | ................ | G06F 16/273 707/613 |
| 2006/0155725 A1 | 7/2006 | Foster et al. | | |
| 2006/0195460 A1 * | 8/2006 | Nori | ...................... | G06F 16/252 |
| 2007/0073712 A1 | 3/2007 | Falk et al. | | |
| 2008/0301168 A1 * | 12/2008 | Adler | .................... | G06F 16/284 707/999.102 |
| 2014/0173702 A1 | 6/2014 | Wong et al. | | |
| 2015/0293962 A1 | 10/2015 | Van Oortmerssen et al. | | |
| 2015/0363494 A1 * | 12/2015 | Norman | ................ | G06F 16/951 707/769 |
| 2016/0170977 A1 | 6/2016 | Engelko et al. | | |

(Continued)

OTHER PUBLICATIONS

Maity, Biswajit, et al. "A framework to convert NoSQL to relational model." Proceedings of the 6th ACM/ACIS International Conference on Applied Computing and Information Technology. 2018 (Year: 2018).*

(Continued)

*Primary Examiner* — Mohsen Almani
(74) *Attorney, Agent, or Firm* — Fountainhead Law Group, PC

(57) ABSTRACT

Embodiments relate to metadata-based generic parsing of an incoming data object to transform it for different purposes, such as conversion into a format more suitable for a specific storage type. The received data object comprises members organized according to a structure, each member containing data. The object's structure and the member's type are defined by the associated metadata. The metadata is referenced by parsing logic to generate a schema representing the structure of the data object in a different format (such as an ER table schema). The schema is then stored. When data is received, the metadata is referenced to parse the corresponding object's data accordingly and for ingestion into the generated schema and storage.

19 Claims, 14 Drawing Sheets

(56) References Cited

U.S. PATENT DOCUMENTS

| | | |
|---|---|---|
| 2016/0224659 A1 | 8/2016 | Robichaud |
| 2017/0206245 A1 | 7/2017 | Zhang et al. |
| 2019/0005073 A1 | 1/2019 | Prabhakar et al. |
| 2019/0235852 A1 | 8/2019 | Bartolotta et al. |
| 2019/0392070 A1 | 12/2019 | Johnson et al. |
| 2020/0311063 A1 | 10/2020 | Hari |
| 2023/0075443 A1* | 3/2023 | Senturk ................ G06F 16/258 |

OTHER PUBLICATIONS

Aftab, Zain, et al. "Automatic NoSQL to relational database transformation with dynamic schema mapping." Scientific programming 2020 (Year: 2020).*

Torres, Alexandre, et al. "Twenty years of object-relational mapping: A survey on patterns, solutions, and their implications on application design." information and software technology 82 (2017): 1-18. (Year: 2017).*

Fowler, "OrmHate", dated May 8, 2012, downloaded from https://martinfowler.com/bliki/OrmHate.html, 6 pages.

* cited by examiner

FIG. 3A

```
{
  "displayName":"TE2VX030",
  "id":"dabf57c650604c31",
  "isValid":
  [{
    "content":true,
    "valid_from":"2020-07-14",
    "valid_to":"2020-07-24"
  }],
  "localId":
  {
    "companyCode":"9272",
    "costCenterId":"TE2VX030",
    "logicalSystem":"OH7"
  },
  "attributes":
  [{
    "content":
    {
      "description":
      [{
        "content":"TKUICXKQCYPEVUPUNSKYNKAXUKPDIZ",
        "lang":"en"
      },
      {
        "content":"HNZJSOMTAKZAPPFNYDEDZMVX",
        "lang":"de"
      }],
      "isBlockedForPrimaryPosting":false,
```

300

306 — 302 — 306 — 306

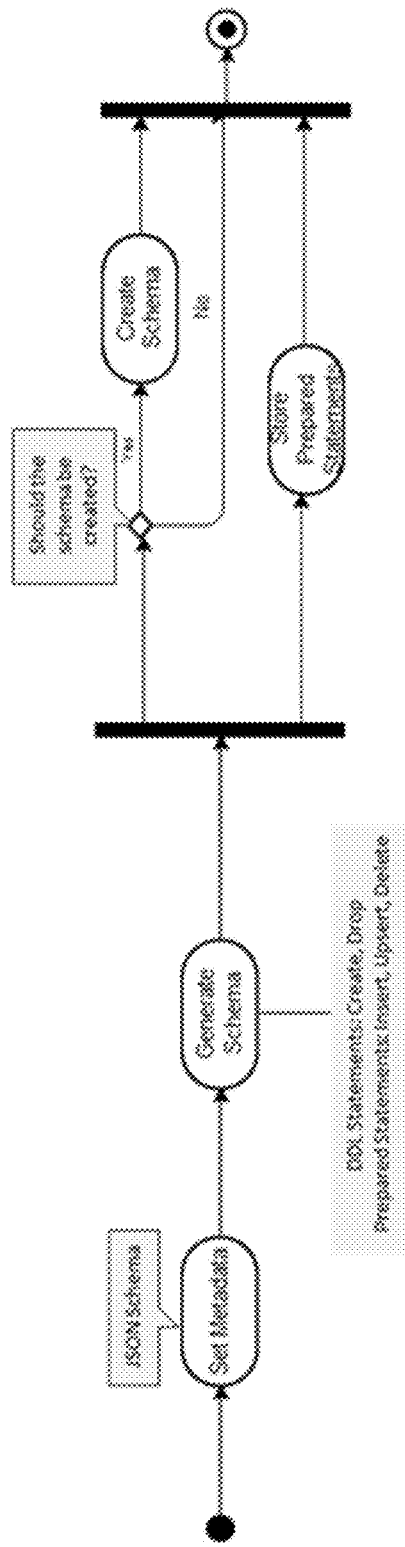 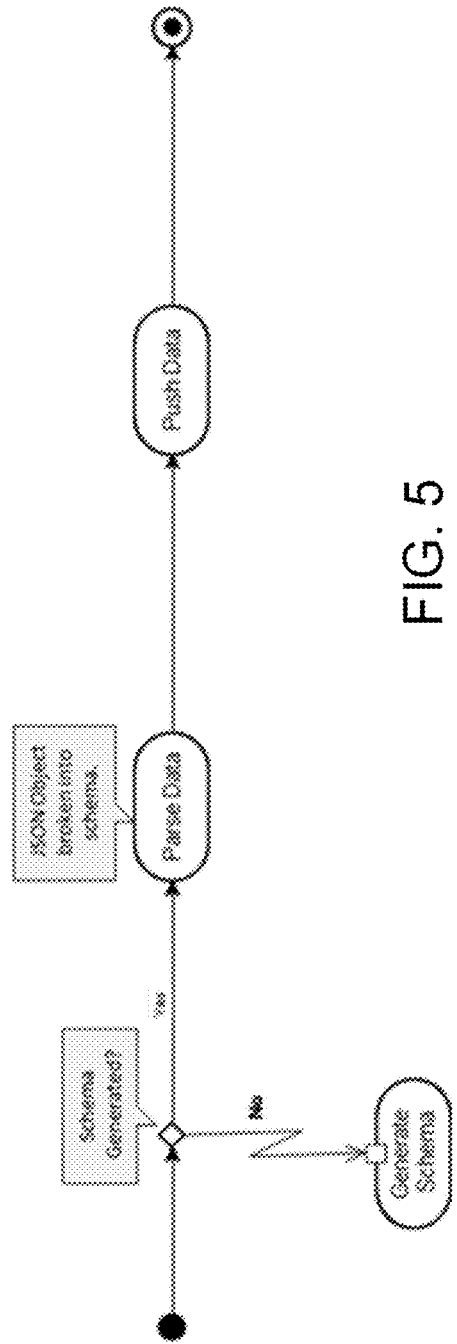
FIG. 5

| Statistics | Small-Size Object (Avg) | Medium-Size Object (Avg) | Large-Size Object (Avg) | Highly Varied Object Sizes (Small to Very Large) |
|---|---|---|---|---|
| Count (Objects Processed) | 312 | 10,001 | 127,918 | 51,029 |
| Total Time (ms) | 41.15 | 4,215.96 | 87,245.40 | 57,289.07 |
| Total Time (s) | 0.04 | 4.22 | 87.25 | 57.29 |
| Average Time (ms) | 0.13 | 0.42 | 0.68 | 1.12 |
| Std. Deviation (ms) | 0.15 | 0.25 | 0.55 | 1.50 |

FIG. 11

METADATA-BASED GENERIC PARSING

BACKGROUND

Unless otherwise indicated herein, the approaches described in this section are not prior art to the claims in this application and are not admitted to be prior art by inclusion in this section.

Reliance upon data objects is central to the processing of many programming languages. Entity-Relational (ER) tables are used by databases both for fast storage to applications, and for analytics purposes. Comma Separated Values (CSVs) can be used for long term storage or conversion to spreadsheets.

Distributed application architectures are increasingly being employed—e.g., for cloud applications. The development and integration of such distributed applications may involve many data transformations or mappings—e.g., from data objects to events or from events to database objects.

SUMMARY

Embodiments relate to metadata-based generic parsing of an incoming data object to transform it for different purposes, such as conversion into a format more suitable for a specific storage type. The received data object comprises members organized according to a structure, each member containing data. The object's structure and the member's type are defined by the associated metadata. The metadata is referenced by parsing logic to generate a schema representing the structure of the data object in a different format (such as an ER table schema). The schema is then stored. When data is received, the metadata is referenced to parse the corresponding object's data accordingly for ingestion into the generated schema and storage for future reference.

In one possible use case, an embodiment may perform Object to Relational Mapping (ORM) of an incoming data object (which may be a JSON object), the metadata of which is referenced to generate the schema (which can be in JSON). Data from the object is then ingested to an ER table stored in a relational database. Particular embodiments may determine whether to ingest the data object based upon a latest version and/or its full history.

The following detailed description and accompanying drawings provide a better understanding of the nature and advantages of various embodiments.

BRIEF DESCRIPTION OF THE DRAWINGS

FIG. 5 shows simplified flow diagrams of metadata-based schema generation and metadata-based parsing.

FIG. 8 shows a schema for the object of example.

FIG. 10A shows JSON schema branch examples.

FIG. 10B shows JSON schema leaf examples.

FIG. 11 shows metrics for generic parsing according to the example.

DETAILED DESCRIPTION

Described herein are methods and apparatuses that perform data ingestion. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below and may further include modifications and equivalents of the features and concepts described herein.

Figure 1:
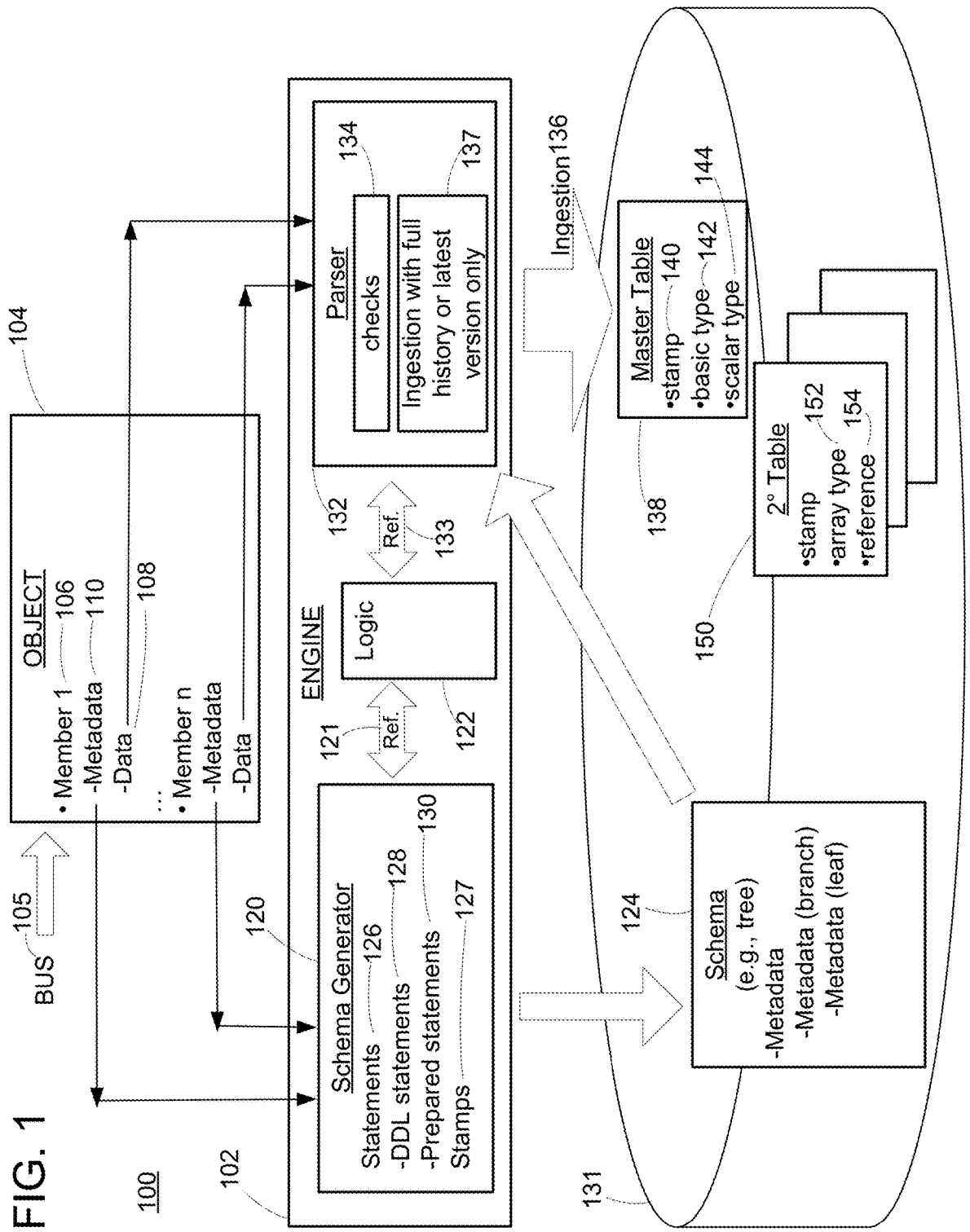
FIG. 1 shows a simplified diagram of a system according to an embodiment.

FIG. 1 shows a simplified view of an example system that is configured to implement metadata-based generic parsing according to an embodiment.

Specifically, system 100 comprises a parsing engine 102 that is configured to receive an incoming data object 104, for example from a source 105 such as an event bus. The data object comprises a plurality of members 106, each comprising data 108 and corresponding metadata 110.

A schema generator 120 of the engine receives the metadata of the object. The schema generator in turn references 121 parsing logic 122 in order to generate a schema 124 from the metadata.

In order to create the schema, the schema generator applies logic to only the metadata of the object. This involves the creation of statements 126 and stamps 127.

One type of generated statement is a Data Description Language (DDL) statement 128. Examples of such DDL statements can include but are not limited to:

Create; and

Drop.

Another type of generated statement is a prepared statement 130 that is subsequently used by the data parsing process to write the data of the object into the database. Examples of such prepared statements can include but are not limited to:

Insert,

Upsert, and

Delete.

The statement generation is performed according to specific conversion parameters of the object data types to the DB data types. The statement generation includes generating table and column names following the object's member names. The mapping from JSON data types to DB types may conform to a particular specification.

The schema is stored in an underlying non-transitory computer readable storage medium 131. According to particular embodiments, the storage medium may comprise a database. The schema may be flat or may exhibit a hierarchical structure such as a tree structure.

Next, the data parser 132 references 133 the logic to read the data from the object members and trigger the process of writing of data to the target tables. This parsing process can also perform one or more checks 134 upon the incoming data, such as:

type consistency,
non-nullable values,
error handling,
logging.

The data parser then performs ingestion 136 of the data into database tables having a structure as determined by the schema. As part of this process, the parser may determine 137 whether the ingestion is to be performed according to a full history of the data object, and/or according to the latest version of the data object.

A master table 138 may include a stamp 140, basic data types 142, and scalar data types 144. Secondary tables 150 may include stamps and array types 152 and references 154 to other tables. Further details regarding the resulting stored tables may be understood from the example discussed later below.

Having performed the data ingestion, the incoming data contained by the structured data object is now stored in a different format—e.g., a relational database table. Those tables can now be referenced as desired. One particular use is in Object to Relational Mapping, as discussed later below in the example.

Figure 2:
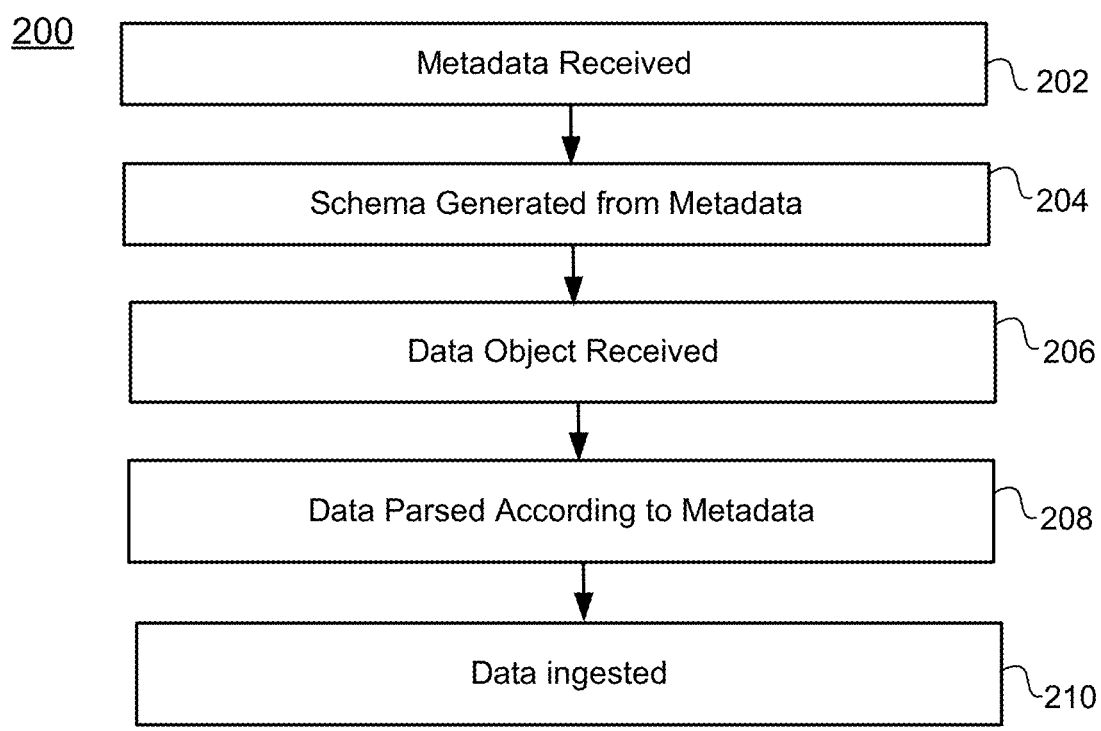
FIG. 2 shows a simplified flow diagram of a method according to an embodiment.

FIG. 2 is a flow diagram of a method 200 according to an embodiment. At 202 metadata is received.

At 204, a schema is generated. At 206, a data object is received.

At 208, the data object is parsed according to the metadata. At 210, the parsed object data is ingested into the schema.

Further details regarding generic parsing according to various embodiments, are now provided in connection with the following example.

EXAMPLE

One practical example of metadata-based generic parsing, is Object to Relational Mapping (ORM). ORM is used by data platforms, analytic applications and programming languages to store objects in relational databases. This is because data platforms and analytic applications integrate with a multitude of use cases and systems, employing several data object types and formats—including but not limited to:

JavaScript Object Notation (JSON) objects,
entity-relational tables (ER),
comma separated values (CSVs),
Parquet.

Objects are intrinsic to the processing of most programming languages. ER is used by databases for fast storage to applications. ER may also be employed for analytics, taking advantage of database capabilities for transforming data into reports, KPIs, and dashboards. CSVs can be used for long term storage or easy conversion to spreadsheets.

Since format conversions are needed for data platforms and analytic applications, JSON to relational mapping has high priority. This is because the primary ingestion channels provide data as event-driven JSON objects, and the primary consumption format is ER.

Json to Relational Mapping

The JSON to relational mapping in this example is a simplified ORM process used to convert object-oriented data structures into relational data. (It is noted that the reverse process is also possible.) This process reads the metadata of the incoming JSON object and assigns every member (down to the most basic data types) to a corresponding database table column where the data will be written.

A simplified approach is employed because objects can have very complex structures (e.g., hash maps, stacks). Also, objects can be composed of or associated with other objects.

Such complex structures can be difficult to convert, especially in an automated form. For some objects, the ORM may be designed manually by an architect or data scientist.

Accordingly, the approach taken by this example processes complex inner structures in a simple manner Embodiments look at scalar objects as a group of basic data types, and all non-scalar or vector types as arrays. Multiple associated or composed objects are treated as arrays of objects. Thus, the metadata and the data objects have corresponding structure.

Since in ORM the object is broken down into several tables, these tables contain information to join the object back together. For the instant exemplary embodiment, this information is called Identification Stamp.

The Identification Stamp contains the master object's ID and other references dependent on the generated structure. The logic is analogous to post-office stamps, where every parcel is stamped with source and destination so that the link is maintained, and the parcel is not lost.

IDs should be unique within the object scope to allow the unique assignment to a parent. The IDs can be created in different ways, e.g. by generation of a Universally Unique Identifier (UUID), or a sequence number.

The simplified approach according to embodiments breaks down the object members into master and secondary relational tables. The master table contains the objects' basic and scalar types. The vector or array types are placed in what we call secondary or foreign tables.

The object breakdown in this example conforms to the following strategy.

1. Scalar basic data type(s): written in the master table along with the Identification Stamp.
2. Scalar objects: if it is an association to another object, then this object's ID is added to the master table as a reference to the other object; if it is a composition, then the members of this object are added to the master table.
3. Array of basic data type(s): a new table is created for this type(s) and each row will consist of the Identification Stamp, array index and the data type(s).
4. Array of objects: a new table is created for this object, where each row will also contain the Identification Stamp and the members. If these members are themselves objects or arrays, they are also be processed in a cascading effect, by the rules defined here. In this manner, the inner arrays will also spawn secondary tables of their own, whose Identification Stamp must include the index from the parent array.

Figure 3:
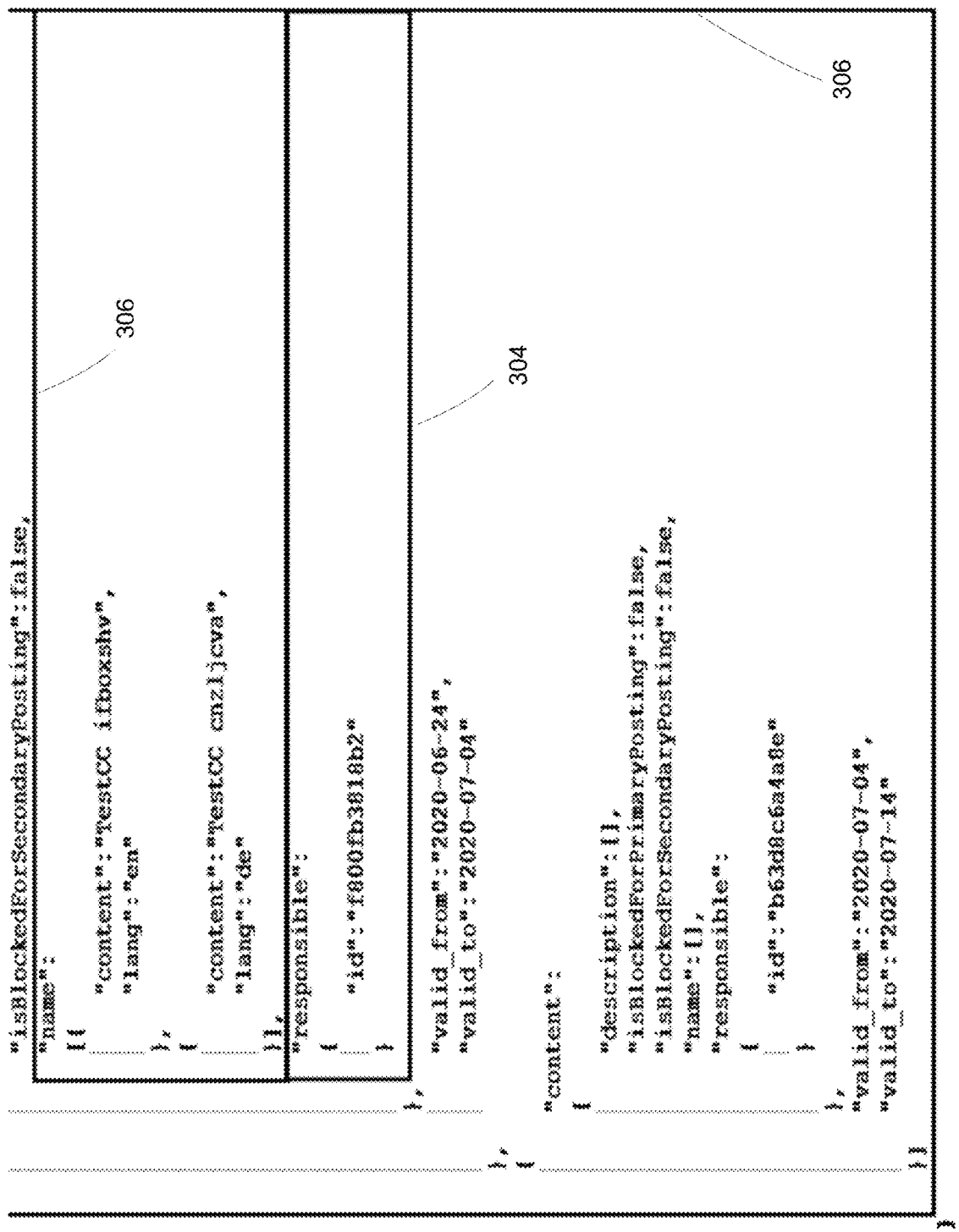
FIGS. 3A-B is an example object with members grouped into types.

FIGS. 3A-B show that the data type used for this example, is the Cost Center (CC) ODM aligned object 300. FIGS. 3A-3B contain data in the JSON format, and will be used to exemplify how the steps above can be used to map data into the different tables.

The rectangle 302 reflects inner scalar composite objects. The rectangle 304 represents scalar references to associated objects. The rectangles 306 reflect arrays of objects. In this example the attribute member is an array of objects, which in its turn also contains other arrays of objects.

Figure 4:
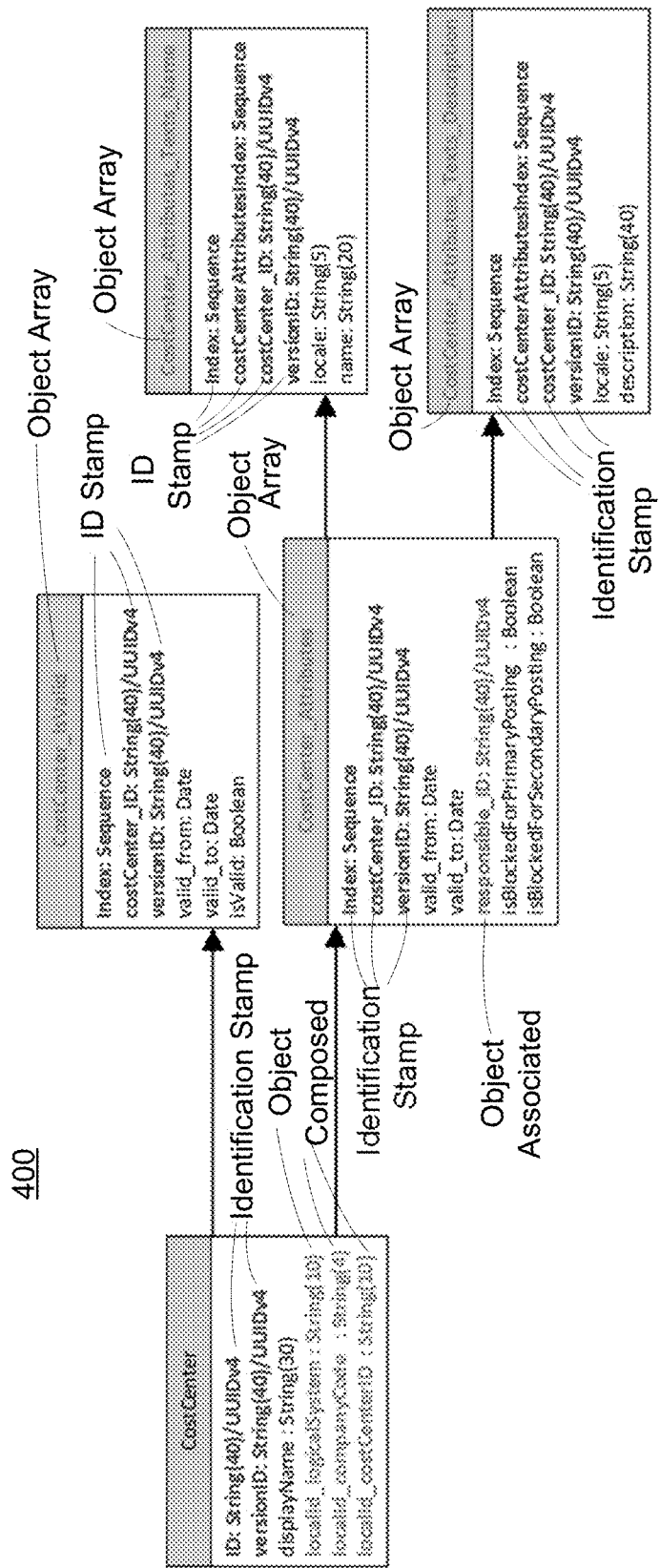
FIG. 4 shows an entity-relationship model generated from the object of FIGS. 3A-3B according to the example.

Considering the metadata-based generic parsing applied to the CC data object, the ER model is derived and depicted in FIG. 4. The CC master table contains, along with the scalar basic types of the CC object, the scalar basic types of the inner composite object localId.

The isValid and attribute object arrays and their members are included in their own tables associated with the master table by the Identification Stamp as a foreign key, which contains an index as primary key paired with the Cost Center Identifier (CCID).

The attributes table also contains a reference to another object—the responsible_id field. Thus, the attributes table spawns two other tables based on its internal object arrays—the name and description members.

Details of the metadata-based schema generation and parsing process according to this example are now discussed. Parsing involves the actual process that executes the JSON to relational mapping described above.

Parsing uses metadata as a map to the object's structure, for which it performs the following two different tasks.

Schema generation. This can be done in design time or be extended to actually perform schema lifecycle during runtime. The top portion 500 of FIG. 5 shows a simplified flow diagram of schema generation.

Data Parsing. This is the process which parses data into the database during runtime. The bottom portion 502 of FIG. 5 shows a simplified flow diagram of data parsing.

To generate the ER schema, the parser applies the process described above and uses only the metadata to create the target schema. This involves the generation of DDL statements, and the prepared statements used by the data parsing process to write the data into the database.

The statement generation follows specific conversion parameters of the JSON data types to the DB data types and includes generating the table and column names following the object's member names.

The data parsing process uses the similar logic as the schema generation process, but produces a different output. The metadata-based parsing process reads the metadata to address the values from the input JSON and trigger the writes to the target tables. This process also performs checks such as type consistency, non-nullable values, error handling, logging and trigger the writing process.

The parsing processes are not storage dependent. But, the intricacies of each storage (such as its languages, interfaces and responses) can bring dependency.

To avoid that, one practice is to separate the parser logic from both the schema generation and data parsing processes from the storage intricacies, by providing a clear interface between the logic and the integration with the storage.

Interfaces can vary depending on the storage. Some examples are SQL and DDL. As database languages sent to the appropriate API's, these could be, e.g., specific operators for SAP Data Intelligence (DI),
API's for object storages with specific message formats, or
others.

It is noted that certain ORM frameworks may be constrained in implementing languages and schema definitions. For example, HIBERNATE runs in Java, and AVRO is limited in its schema definition.

Thus according to embodiments, flexibility in the definition of schemas and mapping rules is imparted. This allows running for example in SAP Data Intelligence.

The ingestion of objects according to embodiments is now discussed. Event-Based ingestion processes the full lifecycle of objects, from creation to deletion.

Some use cases like Machine Learning or Time Series Analysis might require the full history of data, while other use cases may require only the latest versions of the objects. Under the latter circumstances, searching through the history for the latest version could be unnecessarily time consuming.

One challenge of Event-Based ingestion may be to determine the most current object version, and the order of changes made to it. This calls for either:

1) the sequence of changes to guaranteed and delivered in order, or
2) an object version or sequence number is provided. Herein, this data is referenced as version ID.

Ingestion may provide the ingested data as a latest version and/or as full history, depending on the particular use case. Since the data is ingested through generic parsing, it is logical that the generic parsing implements these processes. The full history and latest version approaches are now described respectively below.

Figure 6:
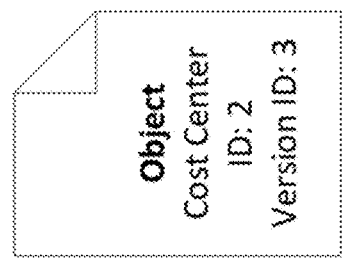
FIG. 6 shows a simplified view of ingestion according to a full history approach.

One approach is based upon a full history of the object. Such an embodiment is illustrated in FIG. 6. This is the simplest approach, where all the different versions of the objects are stored.

Figure 7:
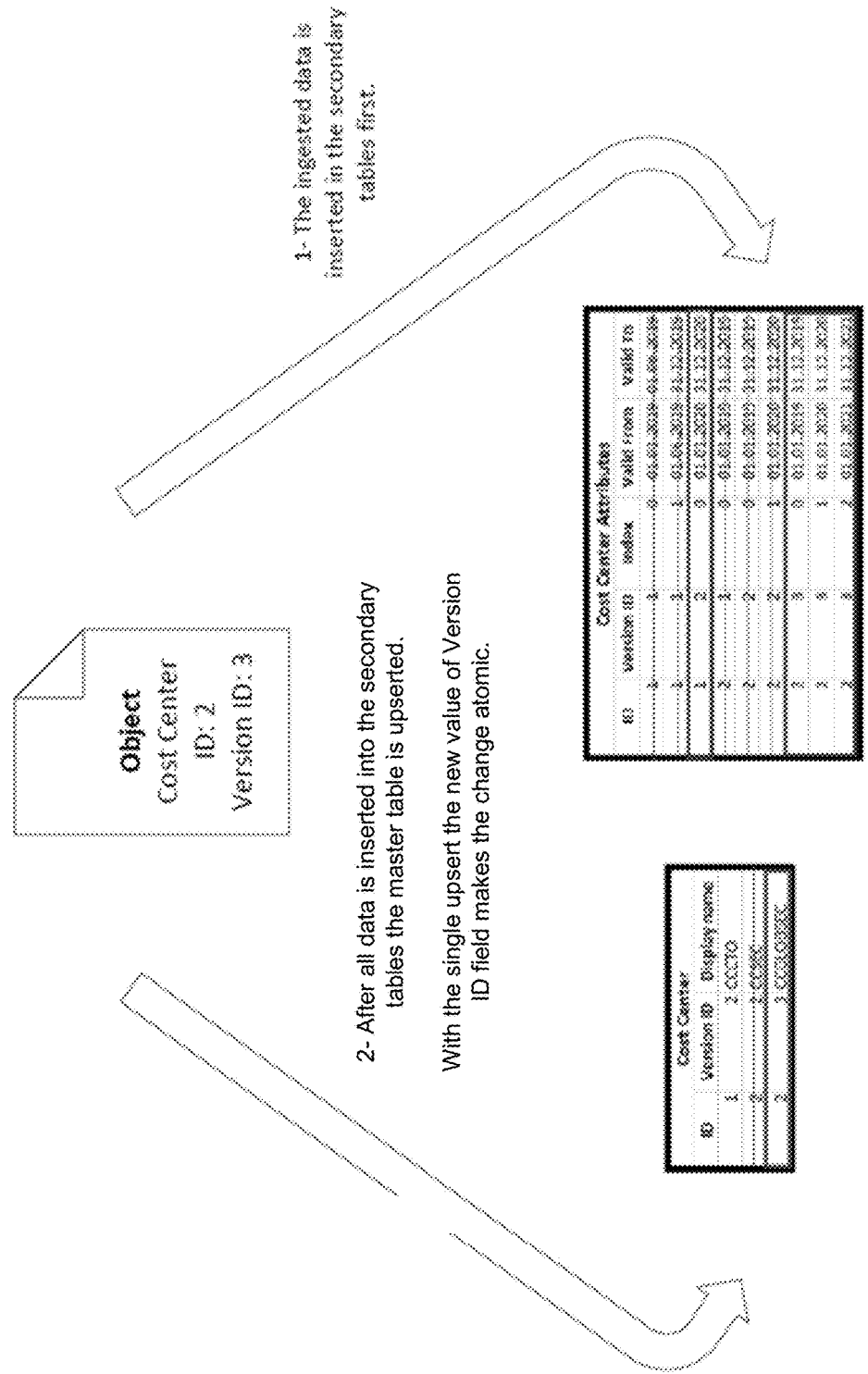
FIG. 7 shows a simplified view of ingestion according to a latest version only approach.

Alternative embodiments may employ a snapshot approach. FIG. 7 shows a simplified view of such a snapshot approach.

Specifically, providing a consistent snapshot of the latest object version while receiving constant updates may be a complicated process which is prone to eventual consistency. The reason for this is that the object is received in a single structure, which is broken down into different tables in a relational structure.

With the tables being updated by different versions of the same object, it is possible that during updating, the data in the tables may have an inconsistent mixture of different versions of the same objects. This can be because the object cannot be fully updated in a single transaction since it is loaded into several tables, unless a transaction mechanism is used such as commit and rollback statements, which can affect performance specially for smaller objects.

To avoid this issue, embodiments may utilize a consistent update process for existing objects. That update process uses a provided object version or sequence, or creates one following the sequence of objects received at a specific moment in time. The process is as follows.

When the object is received, it is parsed into the different tables according to the rules specified above.

After that insertion begins with the data of the secondary tables, only after the secondary tables are fully updated with the object's data, is the master table upserted and the version ID updated.

Since the upsert process to the master table is atomic, only one consistent object version is available if the tables are queried using the object ID and version ID as primary keys.

The above process produces waste in the secondary (child) tables, since they will contain several versions of the objects which are not needed in a latest version only structure. This is solved with minimal maintenance windows, where rows from the secondary tables that do not have a correspondent version ID in the master table, are deleted.

Main characteristics, parsing logic, architecture considerations, and performance considerations for a specific example are now presented. The main technical characteristics of the Generic Parser according to this example are that the object format chosen for input is JSON which stands for JavaScript Object Notation. It is the most common semi-structured object format used for web applications, which made Node JS the logical choice of platform for implementation. NodeJS is also supported SAP Data Intelligence which was the data platform chosen for performance tests.

Metadata is now described. The metadata to be used as a source for parsing can impact the logic of the parser. Parser design and internal logic is based on the metadata type.

Figure 8:
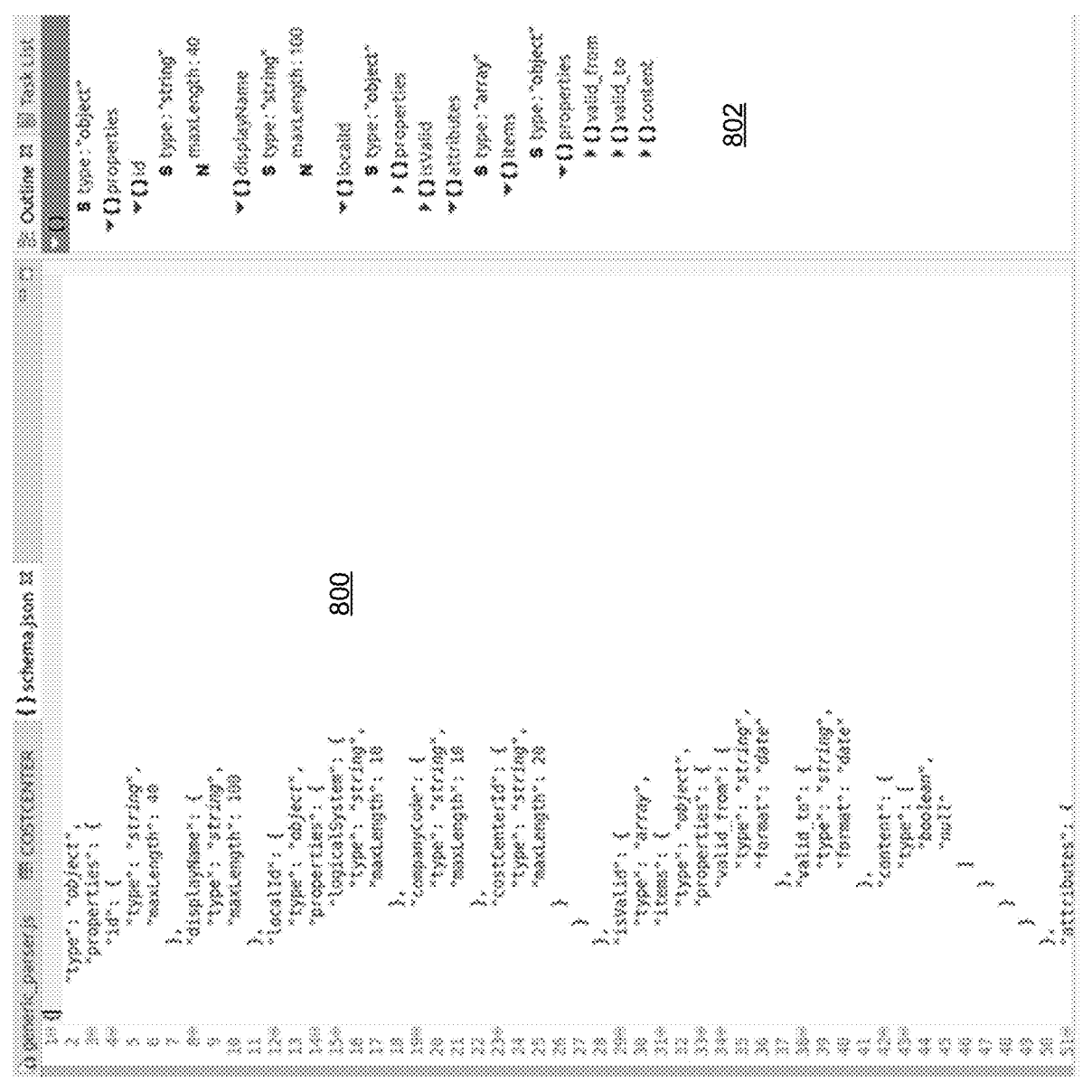

JSON Schema is used in this example since it is a standard for defining and validating JSON Objects. FIG. 8 shows JSON Schema for the Cost Center Object (at left 800 as JSON; at right 802 in condensed form).

JSON Schema is also a JSON Object. Thus, it can be consumed in the same manner as actual data.

Another benefit of JSON Schema is that it is a flat schema. This simplifies the implementation since there is no need for compilation (which is required when the metadata contains complex definitions—such as foreign references to other objects which could be classified as composition or association and annotations that extends the structure of the object, which need to be compiled into flat structures with only basic data types). JSON Schema can also be used to verify objects to make sure they follow the schema.

Parsing logic according to the example is now described. The parsing logic is implemented by a tree traversal procedure.

Figure 9:
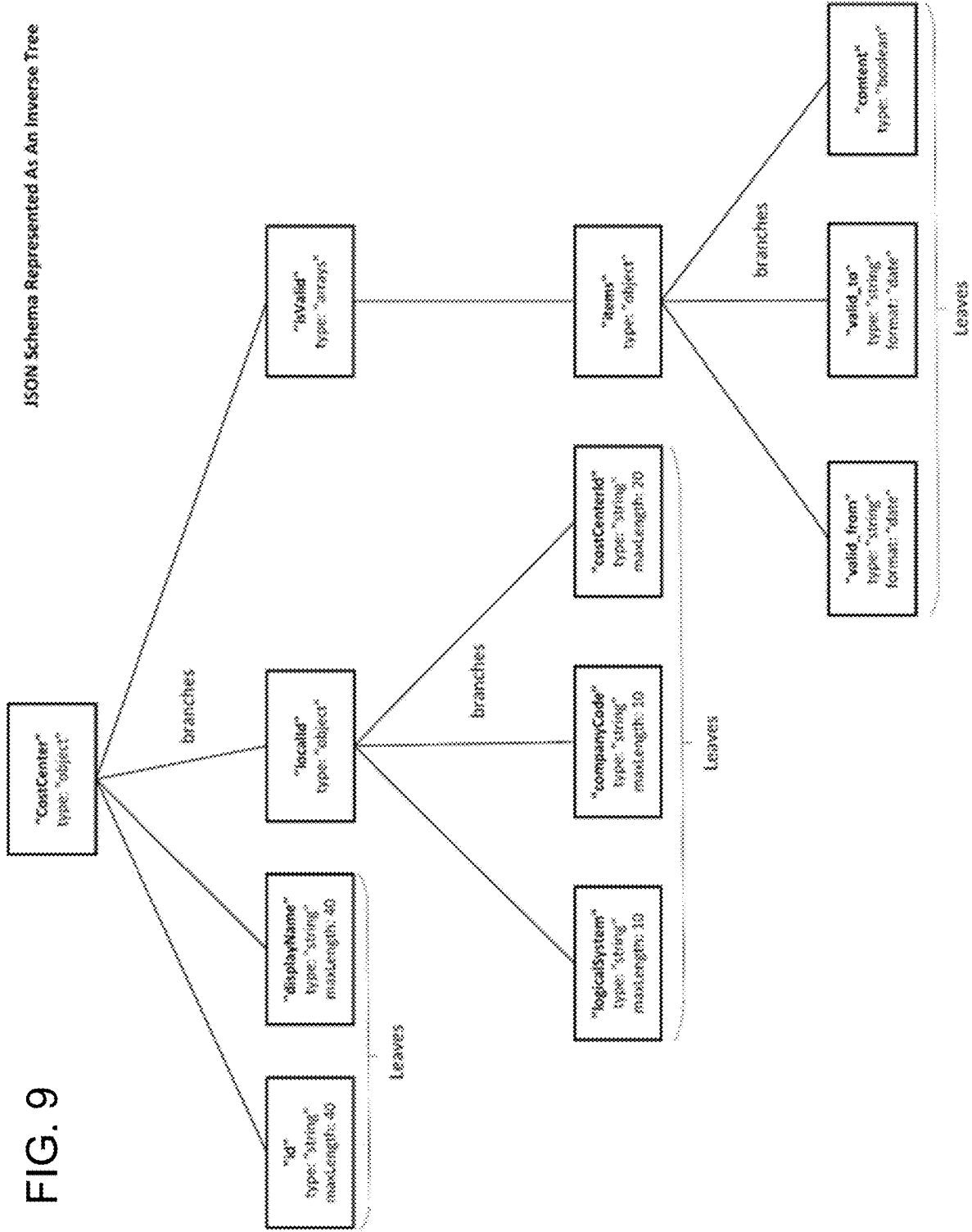
FIG. 9 shows an example of a JSON object represented as an inverse tree.

The procedure treats the JSON Schema as a tree. FIG. 9 shows an example of a JSON object represented as an inverse tree.

The procedure walks through the schema searching for the object members, their types, cardinality, and relationships. The parsing logic is used by the processes in the parser, it acts as a controller for both the schema generation and parsing data processes which are described later.

Figures 10A, 10B:
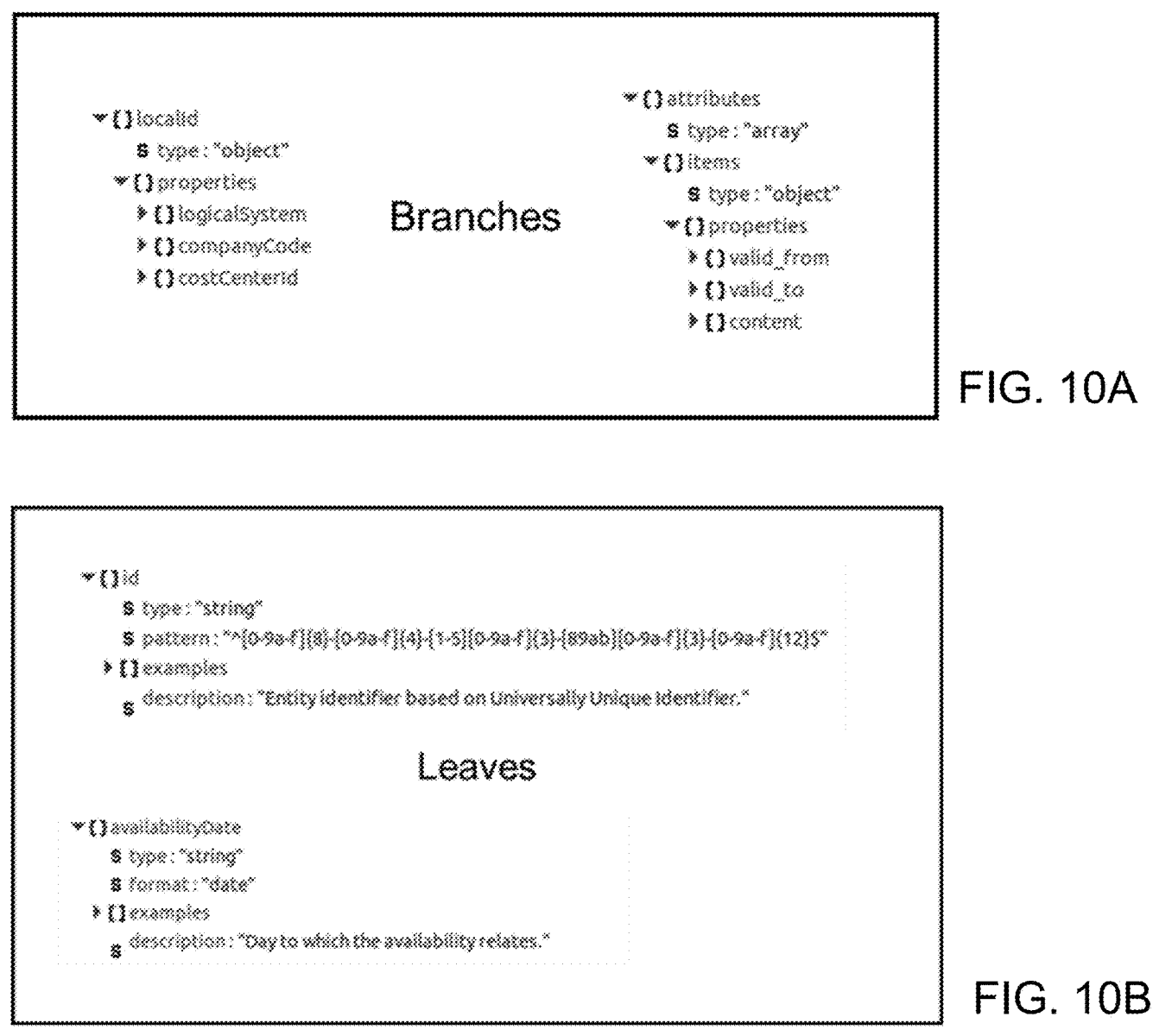

A few characteristics of the parsing logic procedure are given in FIGS. 10A and 10B. The tree traversal procedure follows the typical procedure for traversing trees. It uses a depth-first search post order implementation.

Recursive: the tree traversal functions are recursive and call each other every time the parser takes a step deeper into the tree's structure.

Returning to the tree example of FIG. 9, the tree traversal function iterates branch properties. It iterates through the tree's branches and delves deeper into their members. Examples of branches are:
 Master Object
 Inner Objects
 Inner Arrays
FIG. 10A shows JSON Schema branch examples.

The tree traversal function also processes leaves. Once it reaches the leaves, it processes them and steps back up the tree. They consist of basic scalar data types. FIG. 10B shows JSON Schema leaves examples.

Architectural considerations of the example are now discussed. This example is structured as a library which has been tested using a Node JS test framework and runs high volume test cases as an operator in SAP Data Intelligence.

The example embodiment can be built into any architecture. It can serve as container in a KUBERNETES cluster, and can run inside a NodeJS system imported as a library.

To be able to build an architecture using this procedure, the interface between the two main processes it contains are recognized. Due to clear interfaces, the steps can run simultaneously or be separated into design- and runtime steps for enhanced performance of large data volumes.

The example embodiment implements two processes. The first main process is the Set Metadata. This process implements the generate schema process as defined in the JSON to relational mapping section. It walks through the metadata and generates the following.
 Data Description Language (DDL) statements. These statements generate the schemas and should be used to avoid naming and type mismatches when writing data. This output can be used to change the schema during runtime for schema evolution.
 Prepared Statements. These serves as input either to the parse data process or to the system that the parsed data will send the data to. When creating the architecture, the destination (i.e., the target database) of the prepared statements is considered.
 ID Stamps. The stamps are logical structures applied to the metadata to ensure that the target ER schema can be cross-referenced. It stamps all the tables with object identification so that the master table and all the secondary/foreign tables can be joined consistently. The Set Metadata process does this by manipulating the original metadata, adding ID Stamps to all inner sections of the objects which will be broken down into different tables before the table is generated in the schema. The manipulated metadata is used by the parsing data process to know where to put the ID stamps. It also serves to identify object versions and can be used for data reconciliation purposes. The manipulated metadata must be sent to the parse data process so that it applies the same stamps to the data. It is an important interface between the two processes.

A second main process is the Parse Data process. The parse data implements the process with the same name defined in the JSON to relational mapping.

The parse data process processes the data following the stamped metadata from the Set Metadata processes and generates the following.
 Data Merged with Prepared Statements: if single statements are processed
 Data Parsed into Matrixes: for bulk inserts, sent to the systems that contains the prepared statements in the format that these systems expect, the current implementation supports the SAP Data Intelligence HANA Client Operator.
 Stamps: the stamps generated on the metadata are applied using the object's data, examples: ID, UUID, Version ID, etc.

It is noted that the generic parser's main logic is built on top of the metadata. Therefore, as long as the same metadata is used, it can be extended to include additional features, some of these are listed below.
 Extra Control Flags
  Change conversion rules: one flat table for CSV generation
 Generation
  Sample Data: Performance Testing
  Views
 Schema Evolution: change the schema due to metadata changes during runtime
 Schema/Data Validation
 Reverse Process: Relational to JSON
 DPP Filtering: By removing personal data fields from the metadata, these do not get ingested.

For this example, the performance metrics were made using test data from an SAP MDI (Master Data Integration) test landscape and with generated data using KAFKA with objects of different sizes and with different volumes of data. Since the object structure is as relevant to the performance measurements as the volume, a reference to the object size estimate is included: small, medium, large and varied, where object sizes can vary from small to very large.

FIG. 11 shows the main metrics with each type. The generic parser performance exceeded expectations, with the average parsing time for each object between 0.5 and 1 ms.

The standard deviation is included because it can help explain the typical variation from the average in the full set of measurements.

The deviations can be explained mostly by variation in object size, which can be expected since all these objects have internal arrays and their sizes cannot be estimated. Another cause for variation, especially for the high performance demonstrated, are the typical environment fluctuations caused by operating system task, disk, and memory management.

Returning now to FIG. 1, where the particular embodiment is depicted with the engine as being located outside of the database. However, this is not required.

Rather, alternative embodiments could leverage the processing power of an in-memory database engine (e.g., the in-memory database engine of the HANA in-memory database available from SAP SE), in order to perform various functions as described above.

Figure 12:
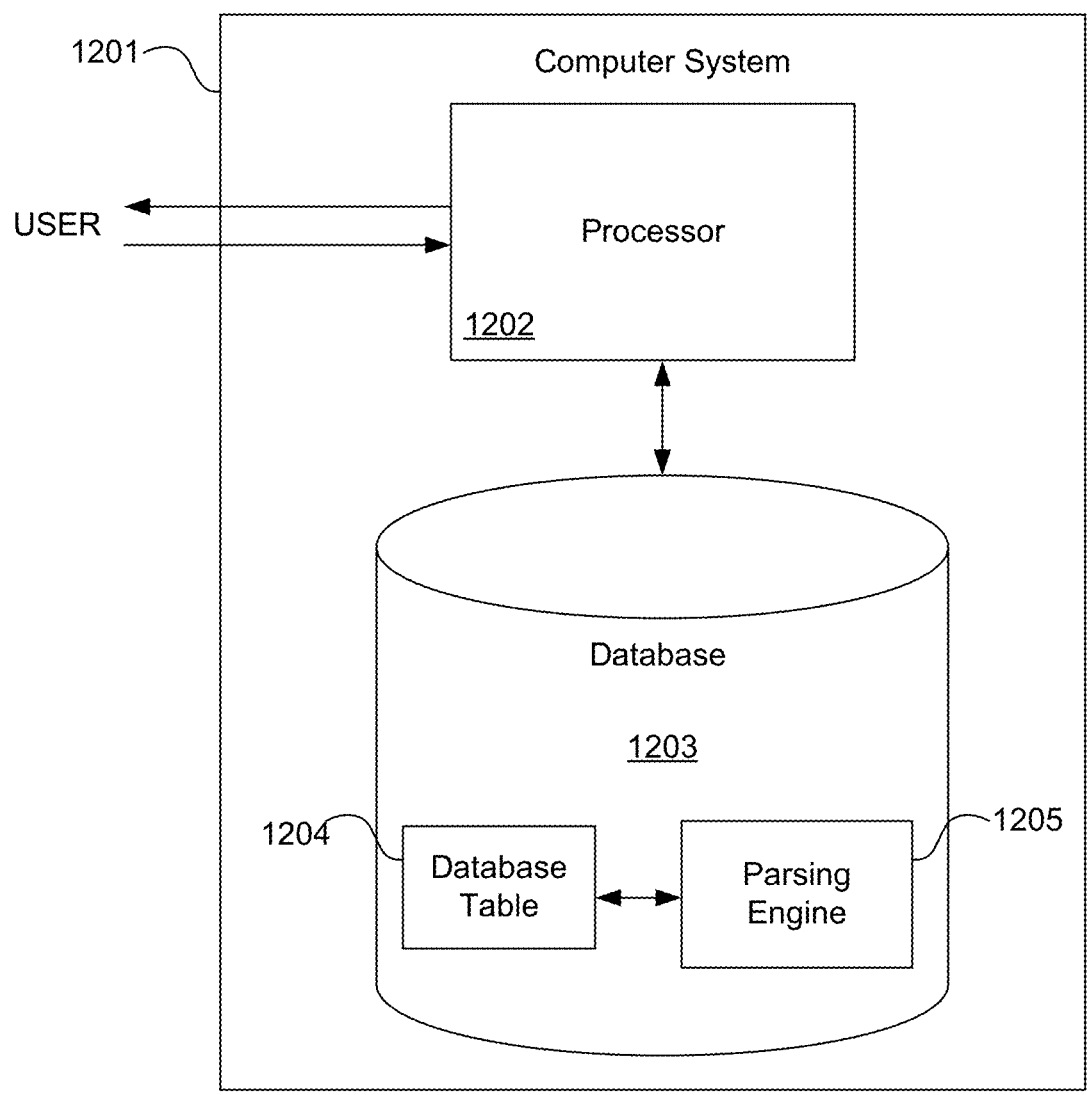
FIG. 12 illustrates hardware of a special purpose computing machine configured for generic parsing.

Thus FIG. 12 illustrates hardware of a special purpose computing machine configured to perform metadata-based generic parsing according to an embodiment. In particular, computer system 1201 comprises a processor 1202 that is in electronic communication with a non-transitory computer-readable storage medium comprising a database 1203. This computer-readable storage medium has stored thereon code 1205 corresponding to a parsing engine. Code 1204 corresponds to a database table. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising:
receiving a data object comprising a plurality of members organized according to a first structure, each member having data and associated metadata;
referencing logic and the metadata to generate a schema representing the first structure; storing the schema in a non-transitory computer readable storage medium;
referencing the logic and the schema to parse the data into a second structure different from the first structure; and
ingesting the data to the second structure in the non-transitory computer readable storage medium.

Example 2. The computer implemented system and method of Example 1 wherein the non-transitory computer readable storage medium comprises a relational database; and the second structure comprises an Entity-Relational (ER) database table <INSERT>.

Example 3. The computer implemented system and method of Examples 1 or 2 wherein the schema is generated by creating:
a Data Description Language (DDL) statement; and
a prepared statement.

Example 4. The computer implemented system and method of Examples 1, 2, or 3 wherein the data object is in JavaScript Object Notation (JSON), EXtensible Markup Language (XML), or Comma Separated Value (CSV) format.

Example 5. The computer implemented system and method of Examples 1, 2, 3, or 4 wherein the second structure comprises a stamp.

Example 6. The computer implemented system and method of Examples 1, 2, 3, 4, or 5 wherein the logic comprises tree traversal logic.

Example 7. The computer implemented system and method of Examples 1, 2, 3, 4, 5, or 6 wherein the ingesting is based upon a latest version of the data object.

Example 8. The computer implemented system and method of Examples 1, 2, 3, 4, 5, 6, or 7 wherein the ingesting is based upon a full history of the data object.

Example 9. The computer implemented system and method of Examples 1, 2, 3, 4, 5, 6, 7, or 8 wherein the non-transitory computer readable storage medium comprises an in-memory database; and the data is ingested by an in-memory database engine of the in-memory database.

Example 10. The computer implemented system and method of Examples 1, 2, 3, 4, 5, 6, 7, 8, or 9 wherein parsing the data occurs during a runtime; and the schema is generated during the runtime.

Example 11. The computer implemented system and method of Examples 1, 2, 3, 4, 5, 6, 7, 8, or 9 wherein parsing the data occurs during a runtime; and the schema is generated during a design time prior to the runtime.

Figure 13:
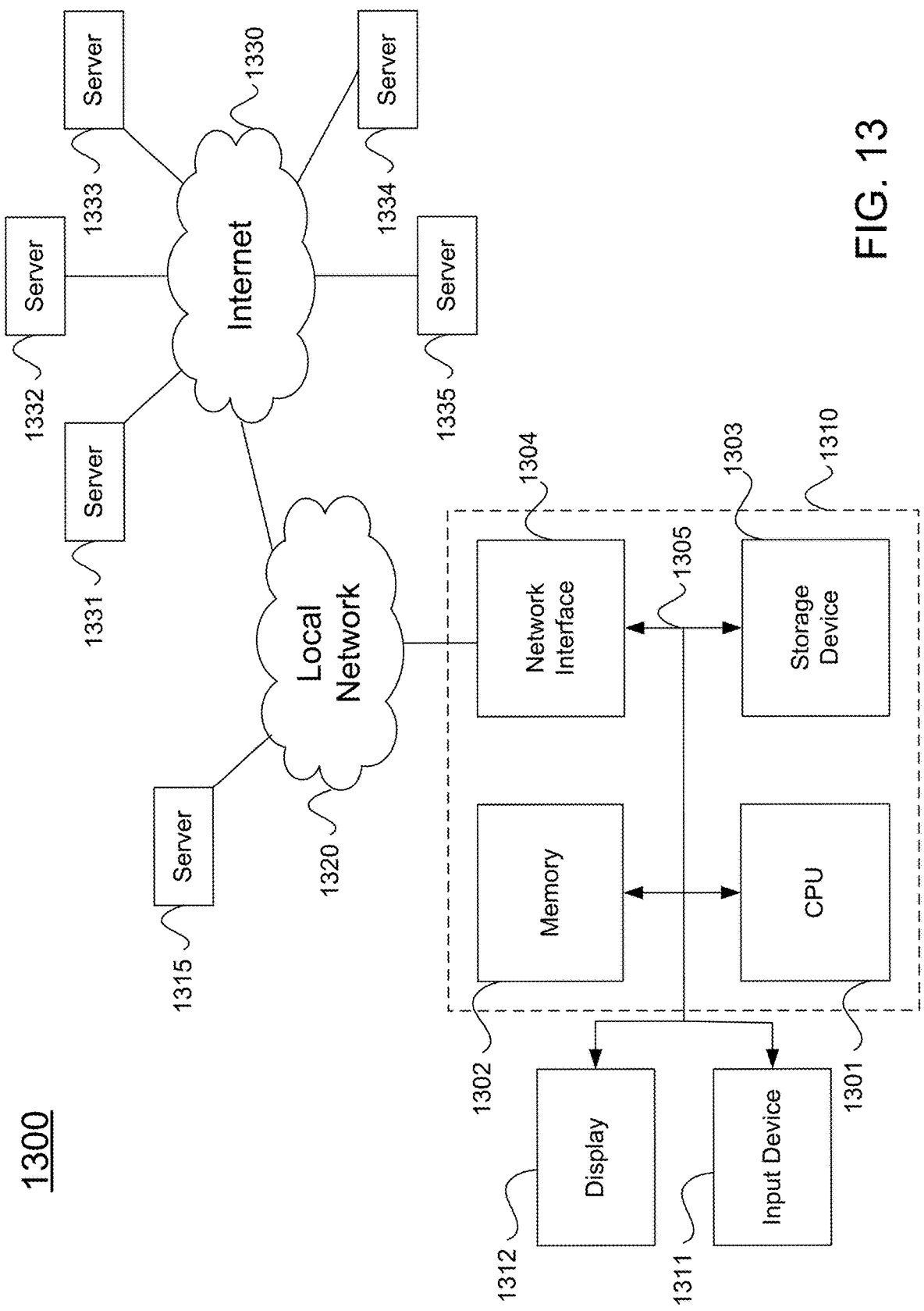
FIG. 13 illustrates an example computer system.

An example computer system 1300 is illustrated in FIG. 13. Computer system 1310 includes a bus 1305 or other communication mechanism for communicating information, and a processor 1301 coupled with bus 1305 for processing information. Computer system 1310 also includes a memory 1302 coupled to bus 1305 for storing information and instructions to be executed by processor 1301, including information and instructions for performing the techniques described above, for example. This memory may also be used for storing variables or other intermediate information during execution of instructions to be executed by processor 1301. Possible implementations of this memory may be, but are not limited to, random access memory (RAM), read only memory (ROM), or both. A storage device 1303 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1303 may include source code, binary code, or software files for performing the techniques above, for example. Storage device and memory are both examples of computer readable mediums.

Computer system 1310 may be coupled via bus 1305 to a display 1312, such as a Light Emitting Diode (LED) or liquid crystal display (LCD), for displaying information to a computer user. An input device 1311 such as a keyboard and/or mouse is coupled to bus 1305 for communicating information and command selections from the user to processor 1301. The combination of these components allows the user to communicate with the system. In some systems, bus 1305 may be divided into multiple specialized buses.

Computer system 1310 also includes a network interface 1304 coupled with bus 1305. Network interface 1304 may provide two-way data communication between computer system 1310 and the local network 1320. The network interface 1304 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1304 sends and receives electrical, electromagnetic, or optical signals that carry digital data streams representing various types of information.

Computer system 1310 can send and receive information, including messages or other interface actions, through the network interface 1304 across a local network 1320, an Intranet, or the Internet 1330. For a local network, computer system 1310 may communicate with a plurality of other computer machines, such as server 1315. Accordingly, computer system 1310 and server computer systems represented by server 1315 may form a cloud computing network, which may be programmed with processes described herein. In the Internet example, software components or services may reside on multiple different computer systems 1310 or servers 1331-1335 across the network. The processes described above may be implemented on one or more servers, for example. A server 1331 may transmit actions or messages from one component, through Internet 1330, local network 1320, and network interface 1304 to a component on computer system 1310. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    receiving a data object comprising a plurality of members organized according to a first structure, each member having data and associated metadata;
    referencing logic to generate a schema representing the first structure;
    storing the schema in a non-transitory computer readable storage medium;
    referencing the logic and the schema to parse the data into a relational database table different from the first structure; and
    ingesting the data to the relational database table in the non-transitory computer readable storage medium;
    wherein generating the schema comprises generating statements to generate table and column names based on member names of the object data during a runtime, and
    wherein ingesting the data comprises reading the metadata to address data values from the data object to trigger writes to the relational database table during the runtime,
    wherein scalar elements in the data object are stored in a master relational table and associated with an identification stamp comprising a unique identification of the data object, and wherein vector or array elements of the data object are stored in one or more secondary relational tables having a plurality of rows associated with the master relational table by the identification stamp as a foreign key containing an index as a primary key paired with an attribute identifier for each particular vector or array member, wherein different vector or array elements are stored in different secondary relational tables.

2. A method as in claim 1 wherein:
    the non-transitory computer readable storage medium comprises a relational database.

3. A method as in claim 2 wherein the schema is generated by creating:
    a Data Description Language (DDL) statement; and
    a prepared statement.

4. A method as in claim 2 wherein the relational database table comprises a stamp.

5. A method as in claim 1 wherein the data object is in JavaScript Object Notation (JSON), XML, or Comma Separated Value (CSV) format.

6. A method as in claim 1 wherein the logic comprises tree traversal logic.

7. A method as in claim 1 wherein the ingesting is based upon a full history of the data object.

8. A method as in claim 1 wherein the ingesting is based upon a latest version of the data object.

9. A method as in claim 1 wherein:
    the non-transitory computer readable storage medium comprises an in-memory database; and
    the data is ingested by an in-memory database engine of the in-memory database.

10. A method as in claim 9 wherein the schema is generated by the in-memory database engine.

11. A method as in claim 1 wherein a first secondary relational table, of the one or more secondary relational tables, comprising a vector or array having at least one member comprising an inner vector or inner array comprises a reference to a second secondary relational table, and wherein each row of the second secondary relational table comprises the identification stamp, a reference to the first secondary relational table, and members of the inner vector or inner array.

12. A non-transitory computer readable storage medium embodying a computer program for performing a method, said method comprising:
    receiving a data object comprising a plurality of members organized according to a structure, each member having data and associated metadata;
    referencing logic and the metadata to generate a schema representing the structure;
    storing the schema in a relational database;
    referencing the logic and the schema to parse the data into an Entity-Relational (ER) database table; and
    ingesting the data to the ER database table stored in the database;
    wherein generating the schema comprises generating statements to generate table and column names based on member names of the object data during a runtime, and
    wherein ingesting the data comprises reading the metadata to address data values from the data object to trigger writes to the ER database table during the runtime,
    wherein scalar elements in the data object are stored in a master relational table and associated with an identification stamp comprising a unique identification of the data object, and wherein vector or array elements of the data object are stored in one or more secondary relational tables having a plurality of rows associated with the master relational table by the identification stamp as a foreign key containing an index as a primary key paired with an attribute identifier for each particular non-scalar element, wherein different vector or array elements are stored in different secondary relational tables.

13. A non-transitory computer readable storage medium as in claim 12 wherein the logic comprises tree traversal logic.

14. A non-transitory computer readable storage medium as in claim 12 wherein the ingesting is based upon a full history of the data object.

15. A non-transitory computer readable storage medium as in claim 12 wherein the ingesting is based upon a latest version of the data object.

16. A computer system comprising:
    one or more processors;
    a software program, executable on said computer system, the software program configured to:
        receive a data object comprising a plurality of members organized according to a structure, each member having data and associated metadata;
        reference logic and the metadata to generate a schema representing the structure;
        store the schema in the in-memory database;
        reference the logic and the schema to parse the data into an Entity-Relational (ER) database table different from the structure; and
        ingest the data to the ER database table in the in-memory database;
    wherein generating the schema comprises generating statements to generate table and column names based on member names of the object data during a runtime, and
    wherein ingesting the data comprises reading the metadata to address data values from the data object to trigger writes to the ER database table during the runtime,
    wherein scalar elements in the data object are stored in a master relational table and associated with an identification stamp comprising a unique identification of the data object, and wherein vector or array elements of the data object are stored in one or more secondary relational tables having a plurality of rows associated with the master relational table by the identification stamp as a foreign key containing an index as a primary key paired with an attribute identifier for each particular non-scalar element, wherein different vector or array elements are stored in different secondary relational tables.

17. A computer system as in claim 16 wherein the data object is in JavaScript Object Notation (JSON), XML, or Comma Separated Value (CSV) format.

18. A computer system as in claim 16 wherein the data is ingested based upon a full history of the data object.

19. A computer system as in claim 16 wherein the data is ingested based upon a latest version of the data object.

* * * * *